United States Patent [19]
Banyas et al.

[11] 3,902,727
[45] Sept. 2, 1975

[54] HANDLING APPARATUS FOR HOLLOW GLASS ARTICLES

[75] Inventors: John D. Banyas, Toledo; Edward A. Ross, Waterville, both of Ohio

[73] Assignee: Owens-Illinois, Inc., Toledo, Ohio

[22] Filed: Nov. 28, 1973

[21] Appl. No.: 419,535

Related U.S. Application Data

[62] Division of Ser. No. 284,700, Aug. 30, 1972, Pat. No. 3,638,010, which is a division of Ser. No. 77,425, Oct. 2, 1970, Pat. No. 3,726,659.

[52] U.S. Cl.............................. 279/106; 269/238
[51] Int. Cl............................................ B23b 31/18
[58] Field of Search ........... 279/106, 107, 108, 109; 269/238, 237, 230, 233

[56] References Cited
UNITED STATES PATENTS
3,612,254  10/1971  Wideman........................... 198/179

*Primary Examiner*—Gil Weidenfeld
*Attorney, Agent, or Firm*—J. R. Nelson

[57] ABSTRACT

An apparatus for handling a hollow glass article and forming a finish thereon in a production line. Glass articles, such as containers, having an integrally formed moil portion on the upper end of the container body portion are loaded in sequence in an upright position into uniformly spaced chucks on a continuously moving endless conveyor. The containers are carried through a first heating zone while being driven in rotation to achieve even thermal exposure of the containers. During transit of the first heating zone, the containers are passed around a vertical end turn to orient the containers in an inverted position, with the moil portion lowermost, as they pass along a horizontal lower run of the endless conveyor. During their transit of the lower run, the containers pass between a linear row of opposed burners which direct a high intensity row of flame jets against a narrow portion of the container body to first thermally sever the moil portion from the body and to subsequently form a beaded finish on the container. The containers are rotated during their passage through this set of burners at a controlled rate to achieve the desired finish formation. The finish is subsequently inspected and containers with malformed finishes are promptly ejected at the inspection station. Containers not ejected at the inspection station are subsequently lowered partially into the pockets of a synchronized pocket conveyor, the container chucks being opened when the container is partially inserted into the pocket to drop the container the remaining distance into the pocket.

6 Claims, 12 Drawing Figures

HANDLING APPARATUS FOR HOLLOW GLASS ARTICLES

RELATED PATENTS AND APPLICATIONS

This application is a division of application Ser. No. 284,700 filed Aug. 30, 1972, which is in turn a division of our application Ser. No. 77,425, filed Oct. 2, 1970, now U.S. Pat. No. 3,726,659.

The machine disclosed in this application forms a portion of the overall container production line disclosed and claimed in the commonly owned copending application of Richard A. Heaton, et al, Ser. No. 24,721, filed Apr. 1, 1970, now U.S. Pat. No. 3,703,363. Containers are loaded into the machine of the present invention by a transfer machine which forms the subject matter of another commonly owned copending application of John D. Banyas, Ser. No. 825,850, filed May 19, 1969, now U.S. Pat. No. 3,590,982. The container which is handled by the machine of the present invention forms the glass portion of the composite container disclosed and claimed in Heaton's U.S. Pat. No. 3,372,826.

BACKGROUND OF THE INVENTION

As explained in detail in the aforementioned copending Heaton, et al. U.S. Pat. No. 3,703,363, the glass container of Heaton U.S. Pat. No. 3,372,826 is initially formed in a ribbon-type forming machine with a moil or waste portion formed integrally with the container body and projecting upwardly from the container body. The purpose of the integrally formed moil is to enable the freshly formed container to be handled immediately upon its removal from the forming machine, at a time when the temperature of the freshlyformed container is so high that mechanical handling elements may mar or deform those portions of the container with which they come in contact. The transfer machine of the aforementioned Banyas U.S. Pat. No. 3,590,982 is designed to take the freshly formed containers from the ribbon machine by grasping the moil portion of the freshly formed containers, thus avoiding contact with that portion of the article which will form the ultimate finished container.

The function of the present machine and method is to receive the containers with the integrally formed moil from the transfer machine of Banyas U.S. Pat. No. 3,590,982, to sever the moil portion and to form the container finish after the moil has been severed.

SUMMARY OF THE INVENTION

The apparatus of the present invention takes the form of an endless chain conveyor driven in continuous movement along an endless path and carrying a series of uniformly-spaced container chuck assemblies. The endless path includes vertically aligned horizontal upper and lower runs interconnected by end turn sections, with the chuck assemblies being adapted to support the containers in an upright position on the upper run and in an inverted position on the lower run. The conveyor chain is formed with uniformly-spaced transverse link pins, with the chuck assemblies being coupled at their forward end to each link pin. Each chuck assembly includes two similar chucks, one behind the other and in order to minimize the change in acceleration as the elongate chuck assemblies move between linear portions of their path and the curved end turn sections, parabolic merging sections are employed at the inlet and outlet ends of each end turn section.

The chain is guided throughout its endless path by fixed guide tracks. A main drive sprocket meshes with both the upper and lower runs of the chain adjacent to, but spaced from one of the end turn sections. The main drive sprocket is driven by a motor which is synchronized with the drives of other machines of the production line, such as the transfer machine which loads containers onto the machine of the present invention and the pocket conveyor which receives containers from the present machine.

In addition to the main drive sprocket, a second or slave drive sprocket is meshed with the lower run of the chain near the opposite end of the lower run. The slave drive sprocket is driven by a constant speed motor through an eddy current or slip clutch at a speed which tends to drive the chain faster than it is driven by the main drive sprocket, the excess power being absorbed in the slip clutch to apply a predetermined degree of tension to the lower run of the chain between the two sprockets. The main drive sprocket and its adjacent end turn are mounted for horizontal adjustment to further adjust chain tension and the end turn section adjacent the main drive sprocket is further mounted for horizontal adjustment relative to the main drive sprocket to regulate tension of the chain passing around this end turn.

Containers with integrally formed moil portions are loaded onto the individual chucks in an upright position at a loading point on the horizontal upper run of the endless conveyor. The chuck assemblies include a seat engageable with the bottom of the container and three symmetrically disposed releasable gripping fingers which engage the body portion of the container to grip and center the container with its axis coincident with an axis of rotation established for the chuck upon its chain carried chuck assembly. The coincident axes extend in a true vertical direction on both the horizontal upper and lower runs. Each chuck includes a sprocket which is engageable with various chains mounted along selected portions of the chuck path to drive the chuck in rotation as it passes along the chain. After the containers are loaded onto the chucks, they pass along the upper run of the conveyor between a pair of opposed "pre-heat" burners which extend along opposite sides of the path of movement of the containers. The pre-heat burners extend along the upper run of the conveyor and around the first end turn section and function to maintain the temperature of the container within a predetermined range during its passage of this portion of their path. A stationary chain engages the chuck sprockets on the upper run to drive the chucks and supported containers in continued rotation to achieve an even exposure of the containers to the pre-heat burners.

After the containers pass around the end turn section, they are inverted and move into a main burner section which includes opposed burners of novel construction extending along the lower run of the conveyor at opposite sides of the path of movement of the containers. The main burners produce a linear row of narrow flame jets which are directed accurately to a narrow band on the containers at the juncture of the moil portion and container body portion. During their passage through the main burners, the chuck sprockets are engaged by one run of an endless chain which is driven by a reversible variable speed drive in a direction and speed such that a selected rate of rotation of the containers is maintained during their passage through the main burners. During their transit through the first section of the main burners, the moil portion is thermally severed by the action of the flame jets and drops freely from the container body. A beaded finish is formed on the severed edge as the containers pass through the remaining section.

After leaving the main burners, the containers pass through a finish inspection station where they are rotated by a second stationary chain. Malformed containers are ejected from the line at this point by manipulating the chuck release mechanism to open the fingers, thus allowing the inverted container to drop freely from the chuck. After passing beyond the inspection-rejection station, the chain moves onto a downwardly inclined section of its path to lower the containers partially into pockets on a pocket conveyor driven in synchronism and alignment with the containers at this section of their path. As stated above, the forward end of each chuck assembly is supported upon a transverse link pin of the conveyor chain, and is supported so that it can be pivoted about the horizontal axis of the pin. A guide roller on the chuck assembly is engaged with a stationary track on the conveyor frame to control pivotal movement of the clutch assembly on the pin, and during their transit of the downwardly inclined portion of the chain path, the chuck assembly is pivoted to maintain the containers supported on the assembly in a true vertical position so that the containers are accurately partially inserted into the aligned pockets of the pocket conveyor. At the lower end of the downwardly inclined section of their path, a chuck release mechanism actuates the chucks to open the gripping fingers to drop the containers freely the remaining distance into the aligned pockets.

The chuck mechanism includes a latch automatically operable to retain the fingers in their open position, thus allowing a momentary actuation of the release mechanism at the normal release point or at the rejection station.

The opened chucks pass around the second end turn onto the upper run of the conveyor and again reach the loading point. The chucks remain latched in their open position until after a container has been lowered between the open gripping fingers. At the outlet end of the loading station, an actuator on the conveyor frame unlatches the chucks, allowing the gripping fingers to move to their closed position.

Although the machine and method are specifically described in terms of handling a specific glass container, the invention is equally capable of handling other types of glass containers or hollow glass articles initially formed as a blank with an integral moil, such as electric light bulb envelopes or glass tumblers, for example.

Other objects, features and advantages of the invention will become apparent in the following specification and in the drawings.

GENERAL DESCRIPTION

Figure 2:
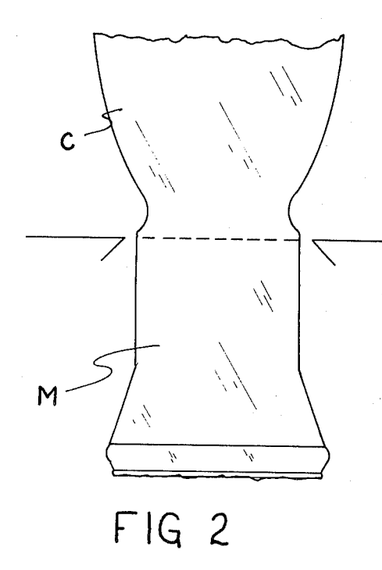
FIG. 2 is a partial side detail view of the finish end portion of a container blank as received by the burn-off machine.
Figure 3:
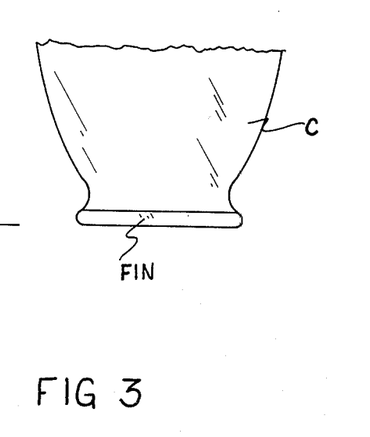
FIG. 3 is a detail side elevational view of the finish portion of the container after the finish has been formed by the burn-off machine.

The function of the burn-off machine of the present invention is to receive containers C (FIGS. 2 and 3) having an integral moil or waste portion M projecting upwardly from the container finish, to burn off the moil M and form a beaded finish FIN (FIG. 3) on the container, and to subsequently deposit the container into a pocket conveyor.

The burn-off machine forms a part of the overall container production line which is the subject matter of a commonly owned copending application of Richard A. Heaton, et al, Ser. No. 24,721 filed Apr. 1, 1970 now U.S. Pat. No. 3,703,363. In this particular production line, the bulb-shaped containers are formed on a ribbon machine with an integral moil portion projecting upwardly from the container mouth or finish. The containers are severed from the ribbon on the ribbon machine at the top of this moil portion and the moil portion is simultaneously grasped by a finger assembly on a transfer machine which forms the subject matter of U.S. Pat. No. 3,590,982. The finger assembly of the transfer machine is adapted to grasp the freshly formed container by the moil portion, because at the time the container is engaged by the transfer machine, it is still at a relatively high temperature from the forming operation and susceptible to being marred or deformed by the finger assemblies of the transfer machine. To complete the container, it is necessary that the moil portion be subsequently severed from the container and that a beaded finish be formed at the point of severance.

Figure 1:
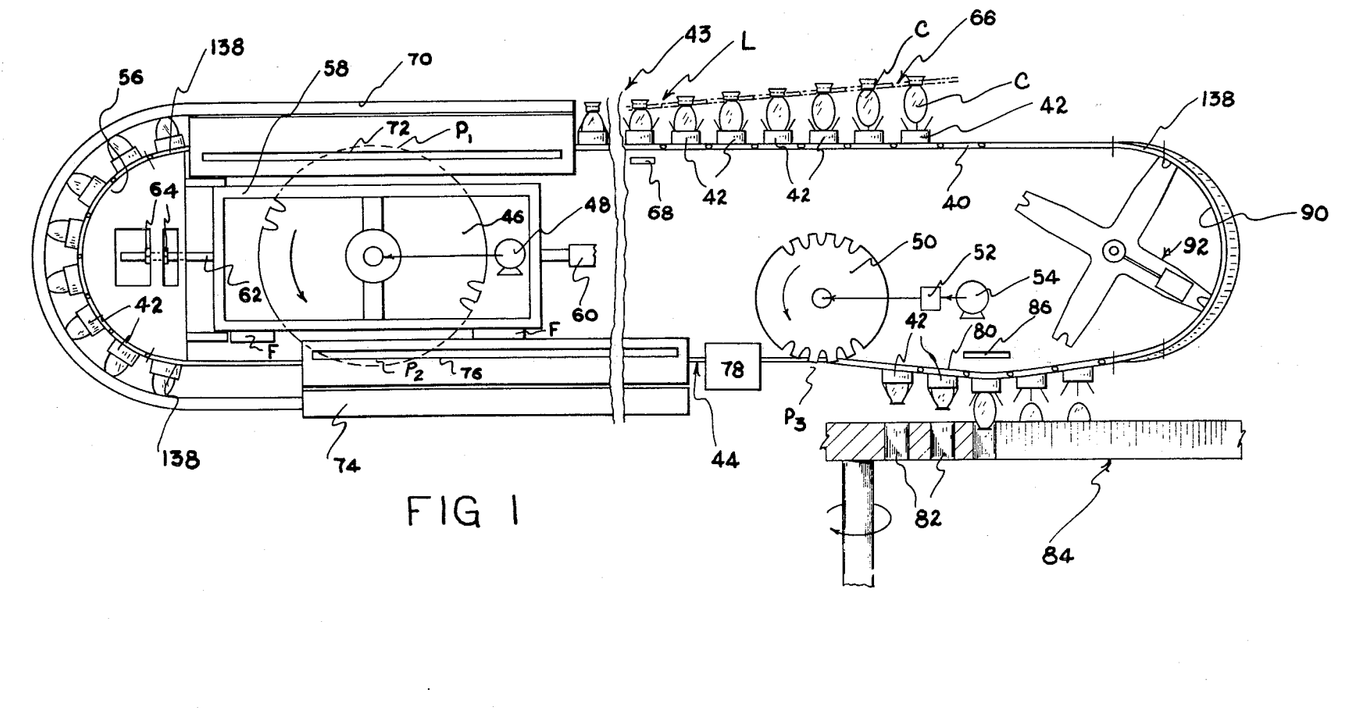
FIG. 1 is a very schematic side elevational diagram of a burn-off machine embodying the present invention.

In FIG. 1, an extremely schematic diagram of the burn-off machine is presented for the purpose of affording an overall view of the machine and the relationship of the individual mechanisms and components to each other. The various components and mechanisms will be individually described in detail below, their relative sizes and locations being such that it is not possible to show details of all mechanisms in a single view.

Referring to FIG. 1, the burn-off machine takes the form of an endless chain conveyor, the chain of which is schematically illustrated at 40. A series of uniformly spaced container chucks 42 are mounted upon and carried by the chain in continuous movement along an endless path having horizontally extending upper and lower runs 43 and 44 respectively. Chain 40 is supported and guided in movement along its endless path by chain tracks mounted upon the machine frame F, not shown in FIG. 1, but described in greater detail below. Chain 40 is driven along its endless path in a counterclockwise direction as viewed in FIG. 1 by a main drive sprocket 46 driven in in turn by a main drive motor 48, and also by a slave drive sprocket 50 which is drivingly coupled through a slip clutch 52 to a slave drive motor 54.

Main drive sprocket 46 is meshed with both the upper and lower run of chain 40 at points P-1 and P-2 and supplies the major portion of the driving force for chain 40. The remaining minor portion of the necessary driving force is supplied by slave drive sprocket 50 which is meshed with the lower run of chain 40 at point P-3 and driven by its drive motor 54 through slip clutch 52. Motor 54 is driven at a rate such that slave drive sprocket 50 attempts to move chain 40 at a faster speed than chain 40 is driven by main drive sprocket 46, part of the excess power being applied to tension chain 40 and the remainder absorbed in slip clutch 52. The purpose of slave drive sprocket 50, in addition to that of supplying a portion of the motive power to chain 40 is to maintain a constant tension in that portion of chain 40 on lower run 44 between points P-2 and P-3. By employing two drives, the magnitude of the chain tension is reduced - there are two drives each effectively pulling a short length of chain rather than a single drive pulling one long length of chain.

Figure 4:
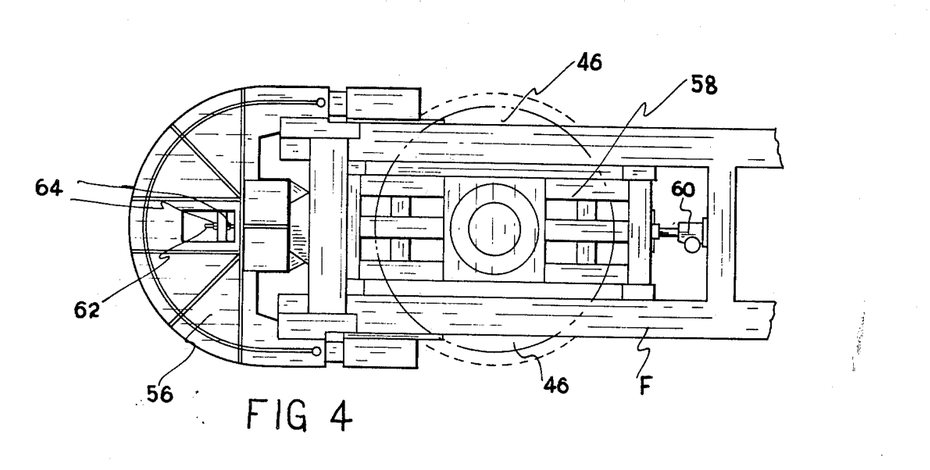
FIG. 4 is a side elevational view, with certain parts broken away or omitted, showing details of conveyor chain tension adjustments.

Overall tensioning of the chain is accomplished by mounting main drive sprocket 46 and that portion of the chain track defining the left-hand end turn 56 of the chain path upon a sub-frame 58 which is mounted for sliding movement from right to left and vice versa as viewed in FIGS. 1 and 4 upon the fixed frame F, of the burn-off machine. Sub-frame 58 can be shifted horizontally as viewed in FIG. 1 relative to the fixed frame as by a screw jack mechanism schematically illustrated at 60 to establish overall chain tension. Adjustment of sub-frame 58 relative to the fixed frame by the jack mechanism 60 establishes the tension of the major portions of the horizontal upper and lower runs 43 and 44 of chain 40 - i.e., that portion of the chains to the right of the points P-2 and P-3 enmeshed with sprocket 46. While it is desired to have an adequate amount of tension in the horizontal runs of the chain, it is desired to have the chain somewhat looser in its passage around end turn 56 and thus end turn 56 is in turn mounted upon sub-frame 58 for horizontal adjustment relative to sub-frame 58 by a threaded adjustment rod fixed to sub-frame 58 and coupled to end turn 56 by a pair of nuts 64.

Containers C are loaded upon chucks 42 of the burn-off machine by the transfer machine of the aforementioned Banyas U.S. Pat. No. 3,590,982 partially indicated at 66 in FIG. 1. The containers C, supported from their moil portion M upon transfer machine 66 are lowered into chucks 42 as the transfer machine and chucks move in synchronism to the left along upper run 43 of the burn-off machine. Support of the containers is transferred from transfer machine 66 to the individual chucks 42 at the loading point designated L on FIG. 1. As described in greater detail below, the chucks 42 include three container gripping fingers which are maintained in an open position until the container C is deposited by transfer machine 66 onto chuck 42, at which time the chuck fingers are closed by a closing mechanism schematically indicated at 68.

As the chucks 42 with their supported containers move to the left along upper run 43 away from loading point L, the containers pass between a pair of opposed elongate burners 70 which apply heat to the container around the region at which the moil portion is integrally joined to the container. Burners 70 are sometimes referred to as "pre-heat" burners although their function might be more accurately described as that of maintaining a controlled rate of cooling of the finish region of the container during its transit between loading point L and the location at which the moil is burned off. The containers, at the time they are received by the burn-off machine at loading point L are at a temperature of between 900° and 1000°F and at the commencement of the actual burning off of the moil it is desired to have the temperature of the container at between 800° and 900°F. Burners 70 can be regulated to achieve the desired temperature drop which would otherwise be dependent on such variable factors as ambient plant temperature, line speed, etc.

In order to achieve even exposure of the container around its entire circumference to the action of opposed burners 70, the container chucks and their supported containers are driven in rotation by an upper spin cycle device schematically indicated at 72. As indicated in FIG. 1, burner 70 is continued around end turn 56 and terminates at the upstream end of the main burn-off and finish forming burners 74. As the chucks enter the main burners 74, they are operatively engaged and again driven in rotation by a second spin cycle mechanism schematically indicated at 76.

As the chucks 42 with the supported containers pass around end turn 56, the container is moved into an inverted position, with the moil portion which is to be burned off now being at the lower end of the container as supported on the chuck so that the moil portion can drop freely from the container upon severance. Main burner 74 is constructed with a first or burn-off section of opposed burners which extend along the line of travel of the finish portion of the container and direct narrow high-intensity flame jets, in a manner to be described in more detail below, at the line of desired severance. During its passage between the main burners, the container is continuously driven in rotation at a controlled rate by spin cycle mechanism 76. The heat applied by the burners is adjusted so that severance of the moil portion from the container will occur when the container is approximately one half of the way through main burners 74. During the latter half of its passage through main burner 74, the burners continue to apply heat to the severed edge of the container and this heating action, combined with the rotation of the container by spin cycle mechanism 76, acts to form a beaded finish on the container.

After the containers pass beyond main burners 74, they are conveyed through an inspection station 78 which inspects the newly formed finish and is operable, by manipulation of the chuck 42, to cause ejection of a container having a malformed finish.

After passing to the right beyond inspection station 78, chain 40 and the supported chucks pass along a downwardly inclined portion 80 of the chain path to lower the inverted containers partially into container receiving pockets 82 of a schematically illustrated pocket conveyor 84 driven in synchronism with chucks 42 of the burn-off machine. Chucks 42 are constructed in a manner to be described in more detail below, so that during their passage along inclined section 80, the containers are maintained in a vertical position for free entry into pockets 82. A chuck opening mechanism schematically illustrated at 86 causes the chucks to open at the lower end of inclined path section 80 to release the container to permit it to freely drop the remaining distance into the aligned pocket 82 of conveyor 84.

During its passage around the right-hand end turn 90 of its endless path, chain 40 passes into operative relationship with a chain lubricating mechanism designated generally 92 which is periodically actuated, in a manner to be described in greater detail below, to lubricate the chain.

CHAIN AND TRACK CONSTRUCTION

Figure 5:
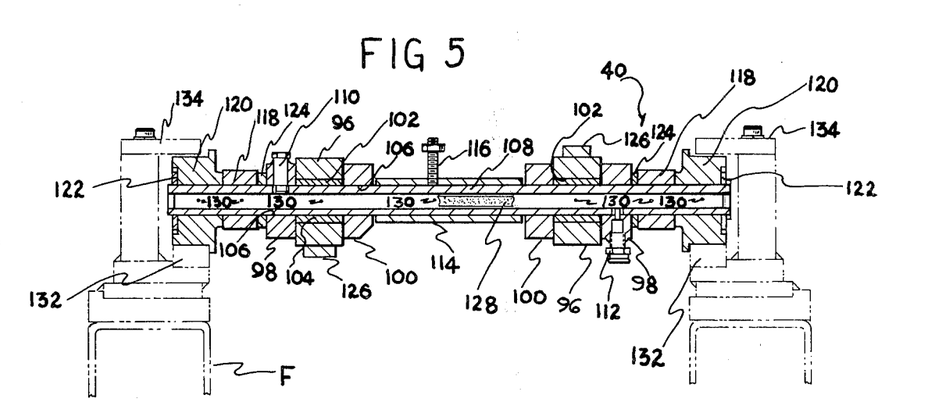
FIG. 5 is a detail cross-sectional view, taken on line 5—5 of FIG. 6, showing details of the link pin construction.
Figure 6:
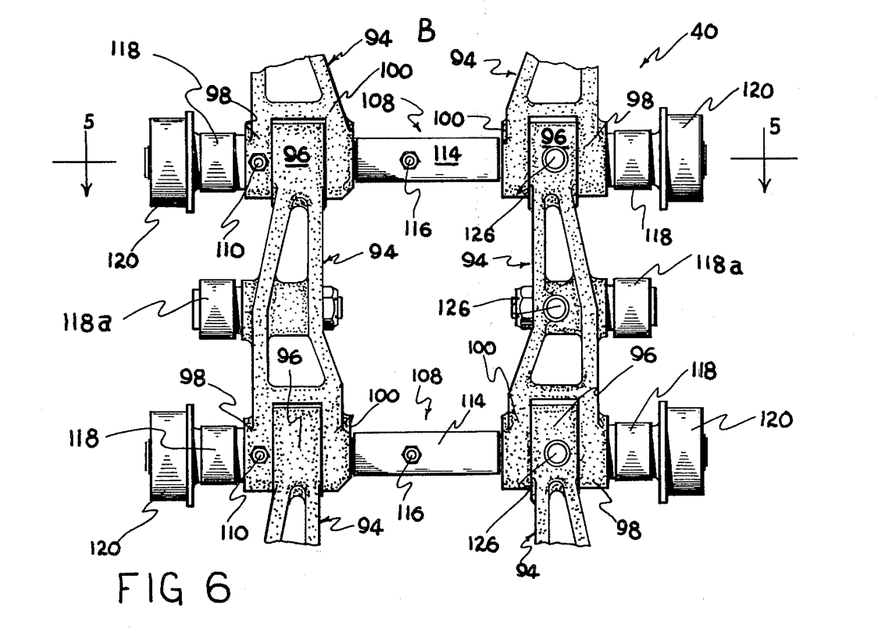
FIG. 6 is a detail plan view of a portion of the main conveyor chain of the burn-off machine.

The structure of endless chain 40 is best shown in FIGS. 5 and 6. Referring first to FIG. 6, chain 40 includes a plurality of pairs of transversely spaced rigid links designated generally 94, each formed with an integral single hub 96 at one end and a pair of transversely spaced hubs 98, 100 at its opposite end, the spacing between hubs 98 and 100 being dimensioned to slidably receive a hub 96. Links 94 on the right and left-hand sides of the chain as viewed in FIG. 6 are identical, the links 94 on the right-hand side of the chain being inverted with respect to the links on the opposite side of the chain. Thus, the hubs 100 are always disposed inwardly of the single hubs 96, while the hubs 98 are always located outboard of the single hub 96.

Referring now to FIG. 5, it is seen that hub 96 is bored as at 102 and a plain bearing 104 is mounted within this bore. Hubs 98 and 100 are coaxially bored as at 106, the successive links being coupled to each other by a hollow link pin 108 which passes through bores 106 of the spaced hubs 98, 100 and through bushing 102 of the single hubs 96. Link pin 108 is freely rotatable within the bushings 102, however, to minimize wear on the pin, hubs 98 and 100 are locked to pin 108 by a plain set screw 110 at the left-hand side of the chain as viewed in FIGS. 5 and 6.

A tubular sleeve 114 is mounted for free rotation and a small degree of limited axial movement on pin 108 between the inner link hubs 100. A threaded stud 116 is fixedly secured to and projects radially outwardly from sleeve 114.

Link pin 108 projects axially outwardly beyond the outer hubs 98 of the links to rotatably support a pair of drive rollers 118 and a pair of support rollers 120 at locations outboard of links 94.

Referring to FIG. 6, an intermediate drive roller 118a is rotatably mounted on each link 94 midway between each pair of pin supported drive rollers 118.

Synchronizing buttons 126 are integrally formed on each single link hub 96 and also upon the midpoint of each link. Buttons 126 are employed in a synchronizing system which synchronizes the speed of all of the various machines in the production line of Heaton et al. U.S. Pat. No. 3,703,363.

A lubricant wick, partially indicated at 128, is mounted in the hollow interior of link pin 108 to transfer lubricant supplied to fitting 112 in a manner to be described in detail below, over the entire interior of pin 108. The lubricant is in turn transferred from wick 128 to the rotary bearing surfaces of the link pin via radial bores 130.

Figure 7:
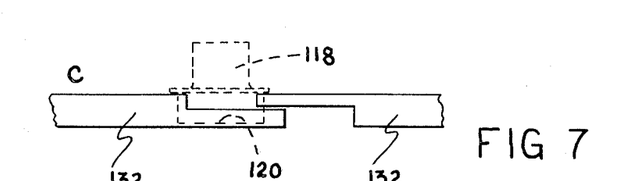
FIG. 7 is a partial plan view showing an expansion joint employed in the chain supporting track.

The endless chain 40 is supported and guided in movement by its support rollers 120 which ride on track sections 132 mounted on the fixed frame F of the machine. Because of the extreme temperature differences between periods of operation and non-operation, the machine frame F and tracks 132 are constructed in a plurality of individual sections, with thermal expansion joints of the type illustrated in FIG. 7 between adjacent track sections.

The support track section including track 132 illustrated in FIG. 5 is a typical section, the particular portion shown being that at some point of one of the horizontal runs of the conveyor. The end turn sections of the track are functionally similar and constructed by fixedly mounting inner and outer track sections 132 and 134 onto a rigid plate such as 136 (see FIG. 18).

As will be described in greater detail below, the chuck assemblies of the machine are carried by chain 40 within the space between links 94 and adjacent link pins 108. This requires link 94 to be of fairly substantial length, and the center-to-center distance between successive link pins 108 is approximately 10 inches. While the links 94 are traveling along the horizontal portions of their path, during normal operation of the machine the links move at constant velocity. During their transit around the curved end turns 56 and 90, the links move along a curved path and hence are subjected during their passage around the end turns to a fairly substantial centripetal acceleration, the magnitude of which is dependent upon the chain velocity and the radius of curvature of the end section. This acceleration can be reduced by making the radius of curvature of the end turn larger, however from the standpoint of manufacturing economy there are practical limits to this approach.

In order to emply end turn sections of a relatively small radius, the chain tracks 132, 134 at the entry and exit of each end turn include a section 138 (FIGS. 1 and 18) which follows a parabolic path having a constantly changing radius of curvature at the juncture of section 138 with the adjacent straight track section to the radius of the constant radius of curvature section of the respective end turns. This gradual transition enables the centripetal acceleration imparted to the link as it enters the curved section to increase or decrease over a finite period of time rather than suddenly changing from a zero centripetal acceleration on the straight track section to a maximum centripetal acceleration as would be the case if the straight track section merged directly with a curved section of constant radius.

In a system where links of substantial length, such as the links 94 of the present machine, should the links pass directly from a straight track section to a curved section of relatively small radius, a whipping or chattering of the links will occur as they pass the transition point because one end of the link is suddenly subjected to a centripetal acceleration of substantial magnitude, while the trailing end of the link is still on a straight section of the path and not subjected to this acceleration. Particularly where the links, as will be described below, are carrying a chuck assembly of fairly substantial mass compared to that of the links, this sudden whipping or chattering is undesirable, because it is a periodic type of vibration which can approach resonance at certain critical chain speeds.

Parabolic track sections 138 minimize this problem by enabling the centripetal acceleration to be applied gradually, rather than suddenly.

CHAIN DRIVE AND TENSIONING ADJUSTMENTS

As set forth above in the general description, the endless chain 40 is driven in movement along its endless path by two separate drives, one of which includes the main drive sprocket 46 and the other of which includes the slave drive sprocket 50. Main drive sprocket 46 engages chain 40 at two vertically aligned points P-1 and P-2 respectively located on the upper and lower runs of the chain, while slave drive sprocket 50 engages the chain at a single point P-3 on the lower run of the chain.

Main drive sprocket 46 is driven by a main drive motor 48 whose speed is synchronized (by a control system including the buttons 126 on chain 40) with the speed of other machines in the production line, specifically transfer machine 66 and pocket conveyor 84. Slave drive sprocket 50 is driven by a constant speed motor 54 which is drivingly connected to sprocket 50 through an eddy current or slip clutch type coupling. The speed of motor 54 is such that it always tends to drive chain 40 at a speed faster than that at which the chain is driven by main drive sprocket 46. A portion of the excess power exerted by motor 54 is employed to apply tension to that portion of the chain between points P-2 and P-3 of FIG. 1, while the remaining excess power supplied by motor 54 is absorbed in the eddy current coupling 52. A constant tension is desired along that portion of the path between points P-2 and P-3, because it is along this portion of the path that the containers pass through the main burner 74 where the moil is severed and the container finish FIN is formed. The severing and finish forming operations call for a very precise positioning of the container relative to the burners, and it is thus necessary that the chain be firmly tensioned during these operations so that all possible lost motion in the chain is taken up.

During its passage around the curved end turns, on the other hand, the high tension applied to the chain during its passage through the main burners is undesirable, because it tends to interfere with the desired flexing of the chain. Referring to FIG. 1, it will be noted that the three points of engagement between chain 40 and sprockets 46 and 50, namely points P-1 and P-2 and P-3 effectively provide points at which the chain tension can be changed.

The overall chain tension is adjusted by manipulation of jack 60 to shift sub-frame 58, which carries main drive sprocket 46, and end turn 56 from right to left or vice versa as viewed in FIGS. 1 and 4. End turn 90 at the opposite end of the machine is fixed, and thus adjustment of sub-frame 58 and sprocket 46 to the left as viewed in FIGS. 1 and 4 will increase the tension in chain 40 from point P-2 around end turn 90 to point P-1. The initial tension in the remaining portion of the chain - i.e., that from point P-1 around end turn 56 to point P-2 is independently adjusted by shifting end turn 56 from right to left or vice versa relative to sub-frame 58 by positioning nuts 64 on the threaded adjustment rod 62 mounted on sub-frame 58. These adjustments are made during the initial startup of the machine to establish what might be termed the normal or reference chain tensions, the term tensions being employed in the plural to indicate the fact that the tension in chain 40 as it passes around end turn 56 may be different than the tension in the chain as it passes around end turn 90.

Under normal operating conditions, the total driving force applied to the chain is distributed between sprockets 46 and 50 in a manner such that approximately 60 percent of the total driving force is supplied by sprocket 46, while the remaining 40 percent is derived from sprocket 50. The two points of engagement of sprocket 46 with chain 40 enable the application of a substantially reduced tension in chain 40 as it passes around end turn 56 between points P-1 and P-2, while the location of slave drive sprocket 50 just before end turn 90 enables the chain tension around end turn 90 to also be reduced.

CHUCK ASSEMBLY

Figure 8:
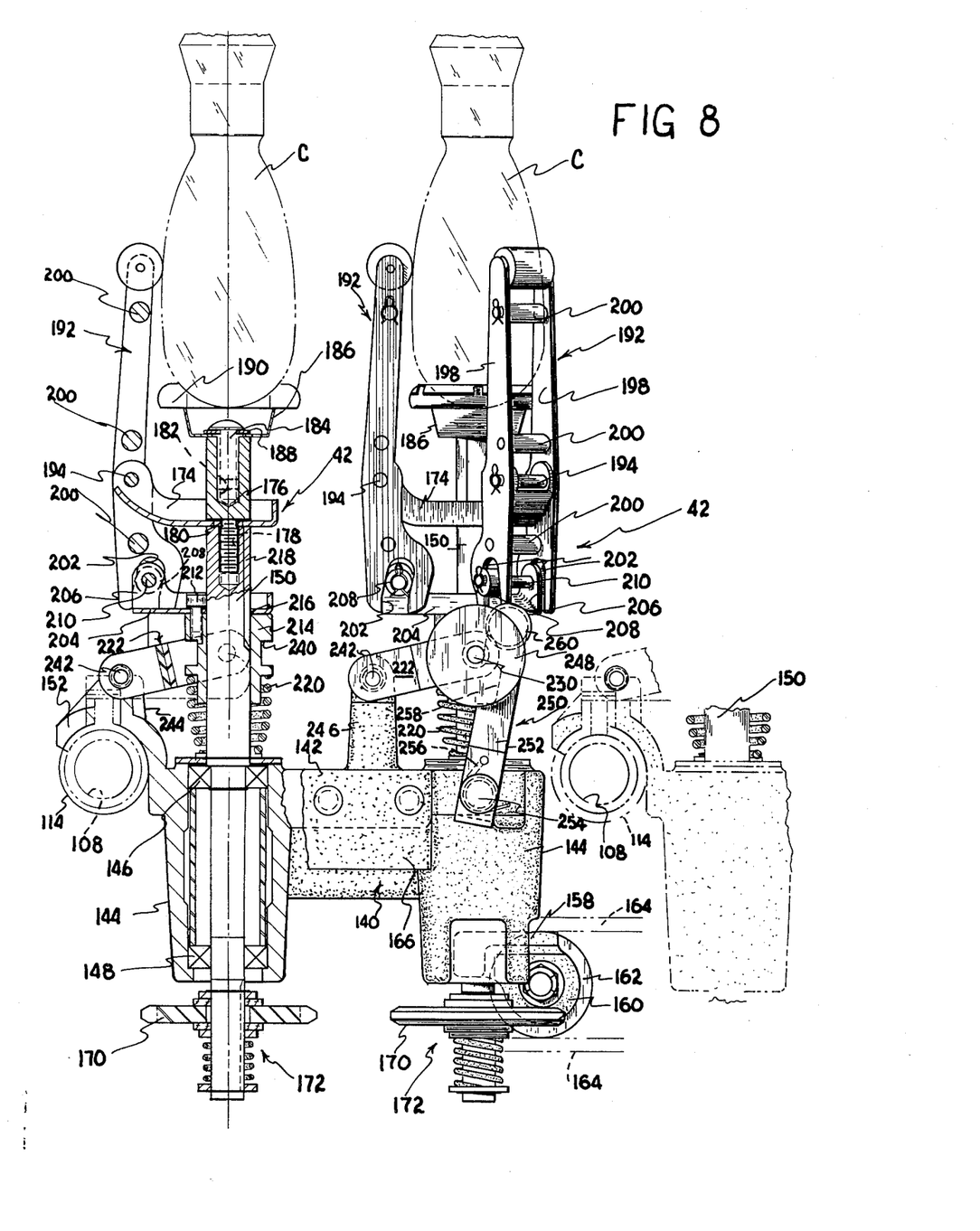
FIG. 8 is a detail side elevational view, partially in section, of the chuck assembly.
Figures 9, 10:
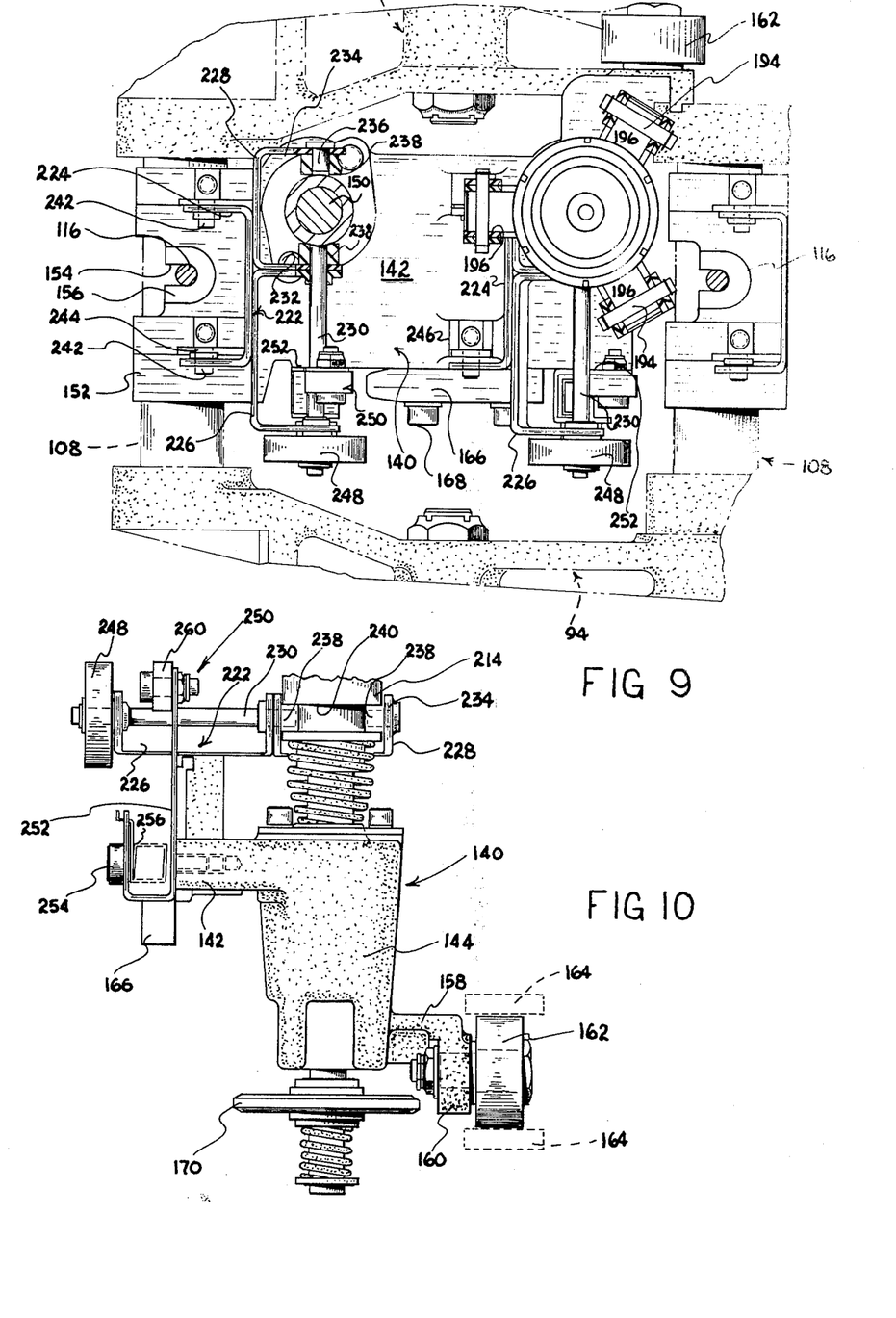
FIG. 9 is a detail plan view, partially in section, of the chuck assembly.
FIG. 10 is a rear view of a portion of the chuck assembly.

The structural details of the container chuck assemblies are best shown in FIGS. 8 through 10. As most clearly seen in FIG. 8, each chuck assembly includes a pair of chucks designated generally 42 which is mounted upon a common housing 140. Housing 140 is preferably formed as a unitary casting having a generally horizontal platform portion 142 formed with a pair of vertically elongated sleeve sections 144 which support, as by upper and lower bearing assemblies 146, 148 the central shafts 150 of the individual chucks.

At its forward end, housing 140 is formed with an integral semi-cylindrical mounting tongue 152 which is shaped and dimensioned to be seated upon the sleeve 114 of a chain link pin 108. As best seen in FIG. 9, tongue 152 is formed with a recess 154 which receives the threaded stud 116 fixedly mounted on link pin sleeve 114, while a flat bearing surface 156 around recess 154 provides a bearing surface against which a nut threadably received on stud 116 can clamp the mounting lug 152 to the chain pin sleeve.

Figure 11:
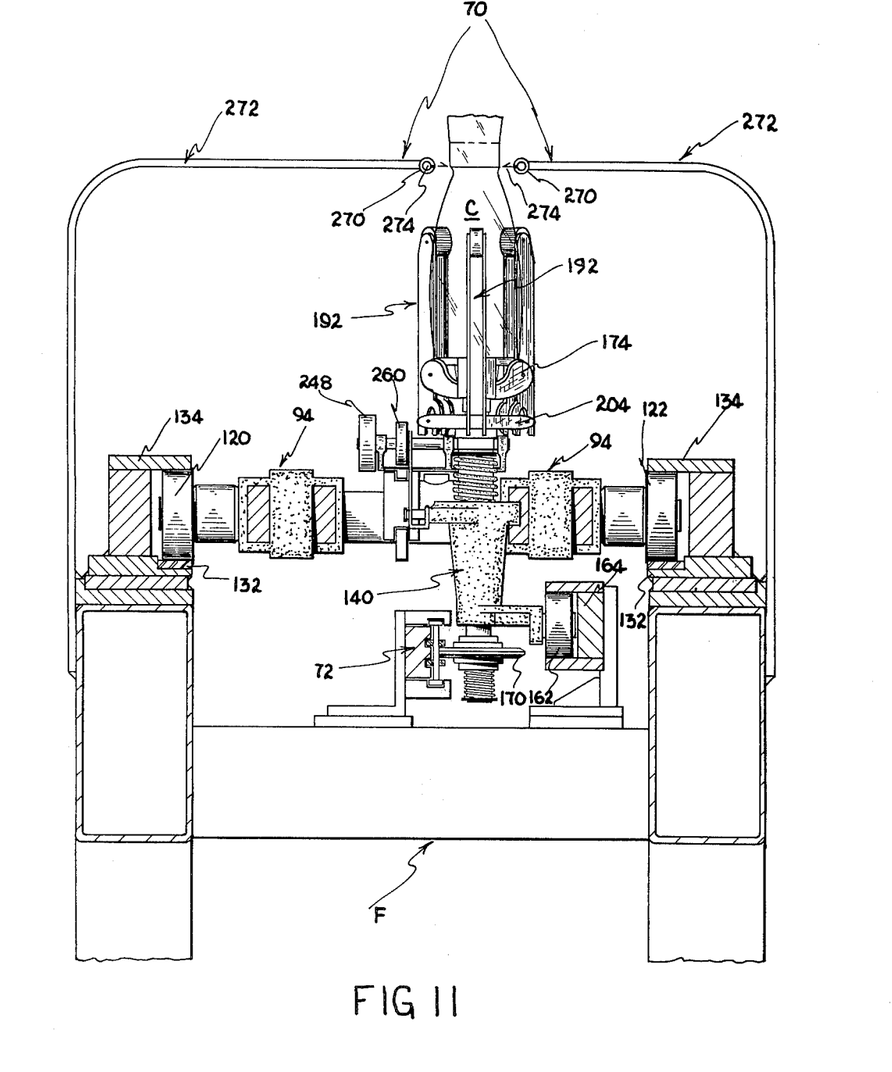
FIG. 11 is a detail cross-sectional view, taken on a vertical plane, showing a chuck assembly in the preheat burner along the upper run of the main conveyor.
Figure 12:
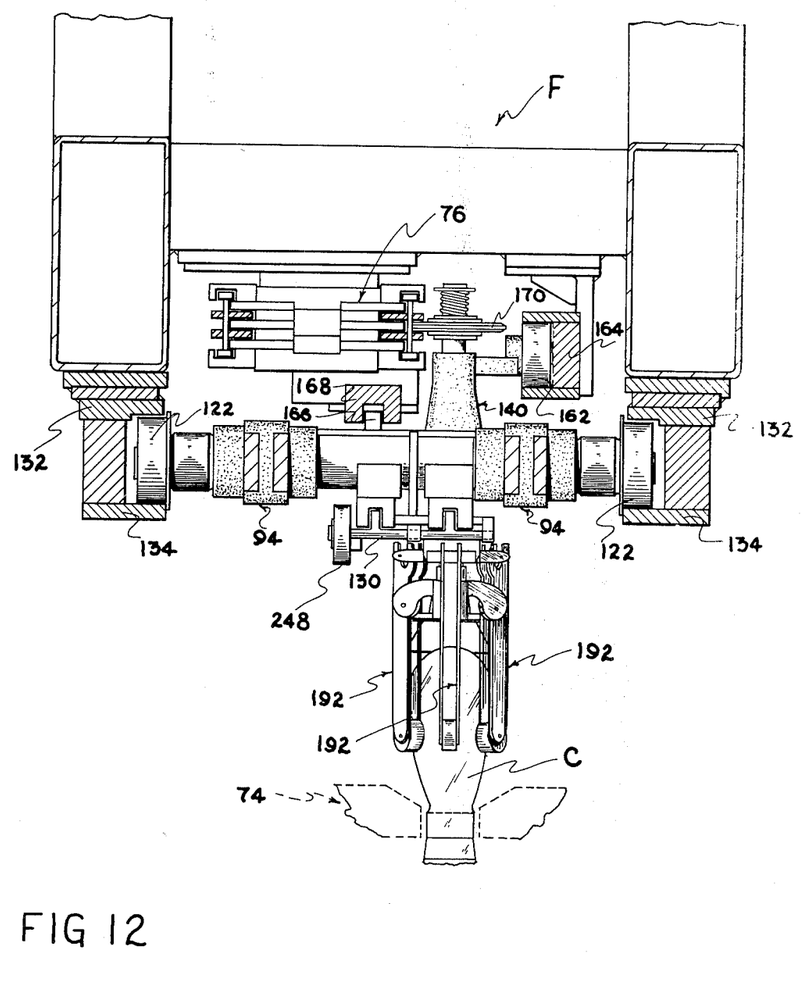
FIG. 12 is a detail cross-sectional view, taken in a vertical plane, on the lower run of the main conveyor, showing a chuck assembly passing along the lower spin cycle portion of its path.

Referring now to FIGS. 8 and 10, a projecting arm 158 is integrally formed on the outer side of the rearwardmost sleeve portion 144 and includes a hub 160 which rotatably supports a chuck support roller 162. Roller 162 rides in a track 164 (see also FIGS. 11 and 12) mounted upon the machine frame to control pivotal movement of housing 140 about the axis of the link pin which supports its forward end.

A guide shoe 166 is fixedly secured to one side of housing platform 142. Guide shoe 166 is employed in conjunction with guide tracks 168 (FIG. 12) mounted upon the machine frame and extending through the main burner section of the chain path to accurately locate the chucks transversely of the chain path during their passage through the main burners. The container has very little side-to-side clearance during its passage through main burners 74 and it is thus necessary to accurately position the containers midway between the burners in order that the burners may act evenly on the container. As explained above, sleeves 114 are mountd on link pins 108 with a slight degree of axial play which is prohibited by guide shoe 166 and its cooperating track 168 during the passage of the chuck through the main burner assembly.

The two chucks mounted upon the common housing 140 are identical and independently operable.

Each chuck includes a main shaft 150, supported in a sleeve 144 of housing 140 for free rotation relative to the housing within bearings 146 and 148. The axis of rotation thus established is mutually perpendicular to the path of movement of chain 40 and to the axes of link pins 108. At various points along the path of movement of the chucks, the chucks are driven in rotation, by chains employed in spin cycle mechanisms 72 (FIG. 11) and 74 (FIG. 12), which engage a sprocket 170 coupled to shaft 150 by a conventional friction coupling designated generally 172.

At the upper end of shaft 150, a fulcrum plate 174 is fixedly clamped to the shaft by a threaded stud 176 which is received within a tapped bore 178 in shaft 150 and formed with a downwardly facing shoulder 180 which bears against the upper surface of plate 174. Preferably, some means, such as a tab, is provided to rotatably lock plate 174 against rotation relative to shaft 150. Stud 176 is formed with a tapped bore 182 in its upper end which threadably receives a container seat retaining bolt 184. Bolt 184 clampingly secures a container seat 186 and washer 188 to the extension of shaft 150 formed by stud 176. Container seat 186 includes an annular seat element 190 which is coaxially aligned with the axis of shaft 150 and conformed to engage the bottom of a container C to support, in cooperation with a group of three containergripping fingers designated generally 192, the container C in coaxial alignment with the shaft axis.

The purpose of mounting fulcrum plate 174 and container seat 186 by means of stud 176, bolt 184 and washer 188 is to enable the chucks to be rapidly converted to handle different sized containers. While the main burners 74 which sever the moil and form the container finish are capable, as will be described below, of limited vertical adjustment upon the machine frame, the range of burner adjustment is a limited one. The path of movement of chain 40, and hence of chuck housings 140, is fixedly established by the chain support tracks 132, 134, and thus if containers C longer than those shown in FIG. 8 are to be handled upon the machine, container seat 186 must be located at a lower elevation in order to locate the container finish line at the same elevation as that of the short containers C shown in FIG. 8. This adjustment can be easily made by replacing the stud 176 shown in FIG. 8 with a shorter stud so that container seat 186 is lowered or located closer to the upper end of shaft 150. This adjustment is readily made by merely removing bolt 184, replacing stud 176 with a shorter stud 176 and then replacing bolt 184 in the new stud.

In some instances, it may be desirable to also replace fulcrum plate 174, which pivotally supports gripping fingers 192 upon fulcrum pins 194, to relocate the fulcrum point of fingers 192. Fulcrum plates 174 can easily be replaced by removing stud 176 (without disassembling the container seat) to enable the original fulcrum plate 174 to be detached, inserting a new fulcrum plate 174 and threading stud 176 back into shaft 150.

Referring to FIG. 9, it is seen that fulcrum plate 174 is formed with three radially projecting arms 196 spaced 120° apart from each other about the chuck axis and that the fulcrum pins 194 are supported in the outer ends of arms 196. Gripping fingers 192 each consist of a pair of side plates 198 secured in spaced relationship to each other as by a series of spacer pins 200. Arms 196 project between the spaced plates 198, and pins 194 project through the arms and adjacent plates 198 to support the finger for pivotal movement in a general plane which extends radially of the chuck axis.

At their lower ends, each of plates 198 is formed with a cam slot 202. An actuating plate 204 is formed with three radially projecting arms, each of which carries a pair of actuating rollers 208 which are received within the respective slots 202 on the lower end of the gripping fingers as best seen in FIG. 8. The overall configuration of actuating plate 204 is quite similar to that of fulcrum plate 174, although the actuating plate is somewhat smaller in its overall dimensions. As was the case with the fulcrum plate, the opposite side plates 198 of the gripping fingers pass on the outer sides of arms 206 of the actuating plate, and rollers 208 are mounted on the outer sides of arms 206 upon a common pin 210 rotatably supported in arm 206.

Actuating plate 204 is fixedly secured, as by bolts 212 to an actuating sleeve which is mounted upon shaft 150 for axial sliding movement relative to the shaft. A tab 216 on actuating plate 204 projects into a keyway 218 on shaft 150 to permit axial sliding movement of the assembled actuator plate 204 and sleeve 214 while locking these parts against rotation relative to shaft 150. A compression spring 220 resiliently biases sleeve 214 upwardly as viewed in FIG. 8.

In FIG. 8, gripping fingers 192 are shown in their closed container gripping position. Opening of the fingers to accomodate loading or unloading of containers from the chucks is accomplished by axially shifting sleeve 214 downwardly from the FIG. 8 position against the action of spring 220. It will be noted that the configuration of the cam slots 202 in the lower end of the gripping fingers is such that their innermost sections are inclined upwardly and inwardly relative to the chuck axis. Axial movement of sleeve 214 and its attached actuating plate downwardly causes rollers 208 to engage the inclined inner sides of slots 202 to force the lower ends of gripping fingers 192 inwardly as the rollers 208 are moved downwardly. Inward movement of the lower ends of fingers 192 pivots the fingers about their respective pins 194 to move the upper ends of fingers 192 outwardly clear of the container C.

Downward axial movement of sleeve 214 is accomplished by an actuating lever assembly designated generally 222 most clearly shown in FIGS. 9 and 10. Each lever 222 is constructed from three U-shaped elements 224, 226 and 228 which are fixedly secured to each other, as by tack welding with a U-shaped element 224 opening forwardly and elements 226 and 228 opening rearwardly and secured in side-by-side relationship to the bight portion of element 224.

A shaft 230 is mounted in and projects through both legs of U-shaped member 226 and also through the leg 232 of U-shaped member 228 which is adjacent member 226. The opposite leg 234 of U-shaped member 228 carries a stub shaft 236 which is coaxially aligned with shaft 230. Stub shaft 236 and shaft 230 each support one of a pair of rollers 238 at the inner side of the opposed legs 234 and 232 of member 228, rollers 238 in turn being located within an annular groove 240 formed on sleeve 214. Levers 222 are pivotally supported on chuck housing 140 by a pair of spaced aligned pivot pins 242 mounted in front or rear projections 244 or 246 integrally formed on housing 242.

Because the biasing action of spring 220 normally maintains sleeve 214 in the position shown in FIG. 8, the interengagement between the walls of annular groove 240 and rollers 238 on lever 222 normally maintains lever 222 in the position shown in FIG. 8. Depression of the lever - i.e., in clockwise pivotal movement about its pivot 242 from the FIG. 8 position is accomplished by the engagement between an actuating roller 248 rotatably mounted on the outer end of shaft 230 with a cam located on the machine frame at an appropriate location along the path of movement of the chuck. When roller 238 engages such a cam, it is depressed to swing levers 222 in clockwise pivotal movement from the FIG. 8 position, this pivotal movement causing rollers 238 to engage the lower wall of groove 240 to drive sleeve 214 axially downwardly on shaft 150 against the action of spring 220. Downward movement of the sleeve, as described above, carries rollers 208 downwardly within cam slots 202 of the gripping fingers to swing the fingers concurrently to their open position.

Shifting of the gripping fingers 192 from their closed position shown in FIG. 8 to their open position is accomplished at either of two locations on the lower run of the machine while the chuck assemblies are in an inverted position. Referring briefly to FIG. 1, it will be recalled from the general description above that the containers are subjected to a finish inspection at inspection station 78 and that containers having an improperly formed finish are ejected from the machine at this point. The inspection-rejection device at station 78 forms no part of the present invention, and may take the form of any of several well-known devices operable for this purpose. In brief, the inspection device is operable to generate a reject signal upon the detection of a sub-standard container, and the reject signal is employed to actuate an ejector which, in this particular case, will project a cam member into the path of the actuating roller 248 on the chuck carrying the flawed container.

As is apparent from FIGS. 8 and 9, rollers 248 on adjacent chucks are not spaced too far from each other (approximately 5 inches in practice) and thus the cam element of the reject device must be moved rapidly into and out of the path of movement of rollers 248 so that it strikes only the roller 248 on the chuck carrying the flawed container and is withdrawn clear of the path of movement of the rollers before the next subsequent roller reaches the reject station. This requirement in turn permits only a momentary depression of the lever 222 which may not hold gripping fingers 192 open long enough to permit the container to drop from the inverted chuck clear of the fingers.

To assure adequate time to allow ejected containers to drop clear of the chuck, and further for the practical reason that once the fingers are open there is no need to close them again until a new container has been inserted into the chuck at loading station L on the upper run of the conveyor, the chucks are constructed with a latching mechanism designated generally 250 which is automatically operable to releasably latch levers 222 in their lowermost or chuck open position. Mechanism 250 includes a lever 252 pivotally mounted on chuck housing 140 adjacent each chuck as by pivot pins 254. A torsion spring 256 resiliently biases lever 252 in a counterclockwise direction as viewed in FIG. 8. When the associated actuating lever 222 is in its upper or chuck closed position, the upper end of lever 252 is resiliently biased against shaft 230 which is carried on lever 222. When lever 222 is depressed to open the chuck, its shaft 230 is carried downwardly along the front edge of lever 252 into alignment with a latching notch 258 (FIG. 8) on the lever which engages shaft 230 to latch actuating lever 222 in its lower or chuck open position.

Reclosing of the gripping fingers at the container loading station L is accomplished by a stationary cam on the machine frame which releases the latch and engages roller 248 to achieve a cushioned closing of the fingers.

PRE-HEAT AND MAIN BURNER ASSEMBLIES

Details of the pre-heat and main burner assemblies are disclosed in parent application Ser. No. 77,425, filed Oct. 2, 1970, now U.S. Pat. No. 3,726,659, and are also the subject matter of a co-pending divisional application Ser. No. 284,565, filed Aug. 29, 1972, now U.S. Pat. No. 3,790,087.

SPIN CYCLE MECHANISM

Two types of spin cycle mechanisms are employed to drive the chucks in rotation during their passage through pre-heat burner 70 and main burners 74. Spin cycle mechanism 72, which extends along the upper run portion of pre-heat burner 70 takes the form of a stationary chain mounted alongside the path of movement of chuck sprockets 170 to engage the sprockets as their chucks traverse this portion of the path. The rate of rotation of the chuck and its supported container, by spin cycle mechanism 72, is thus directly dependent upon the line speed of the chuck. The rate of rotation of the container during its passage through the pre-heat burner 70 is not overly critical, because the sole requirement is that the container be more or less uniformly exposed around its circumference to burners 70.

The rate of rotation of the containers as they pass through main burner 74, where the moil severing and finish forming operations are performed, is more critical, and spin cycle mechanism 76 takes the form of an endless chuck sprocket engaging chain which is driven by a reversible variable speed drive motor so that the rate of rotation of the containers may be varied in accordance with the algebraic difference of the chuck and chain speeds. Further details of the spin cycle mechanism may be found in U.S. Pat. No. 3,726,659.

CHAIN LUBRICATION SYSTEM

Details of the chain lubrication system 92 are shown in FIGS. 18 through 23 and disclosed in parent application Ser. No. 77,425, filed Oct. 2, 1970, now U.S. Pat. No. 3,726,659 and is also the subject matter of copending divisional application Ser. No. 267,677 filed June 29, 1972 now U.S. Pat. No. 3,762,504.

OPERATION

In order to prepare the machine for operation, chucks 42 and main burner 74 are first set up for the particular size of container which is to be handled. Chucks 42 are set up by mounting upon the chucks the particular spacer 188 and fulcrum plate 174 which correspond to the dimensions of the container to be handled. As explained above, the spacers 188 and fulcrum plate 174 are detachably assembled upon the end of the main chuck shaft 150 so that this initial portion of the setup can be conveniently performed without requiring any major disassembly of the chucks.

Transverse spacing of the main burners is accomplished by appropriate adjustment of jacks 292, which locate the burners horizontally to establish the spacing between the burners and the path of travel of the containers. Jacks 318 position the burners vertically relative to the containers to establish a fine adjustment of the location of the line on which the containers are burned off. Pivotal adjustment of the burners to establish a desired inclination of the direction of the flame jets to the horizontal is accomplished by jacks 322.

During their passage through the burners, particularly during the moil severing step, the containers are passed directly through the flame jet in order that the container may contact the high temperature portion — i.e., the tip of the blue "inner cone" —of the flame. The presence of the container within the flame jet disturbs its configuration, much in the same manner as when a stream of water from a hose strikes a wall. By inclining the direction of the flame jet to the horizontal, by adjustment of jacks 322; it is possible in some instances to control the temperature distribution on the container more precisely in the axial direction, thus achieving a more precise severing action.

With the foregoing adjustments made, the entire line is started up, with main drive motor 38 driving main drive sprocket 46 at a speed such that movement of chucks 42 along their endless path is synchronized accurately with the container handling elements of transfer machine 66 and take-out pocket conveyor 84. This synchronism is accomplished by buttons 126 on chain 40 which, at some point along their path, pass beneath a proximity sensor, not shown, which is connected into the control system of motor 48. Similar buttons and proximity sensors are employed on transfer machine 66 and take-out conveyor 84 and fed into a computer which automatically regulates the speed of motor 48 and of the drives of transfer machine 66 and take-out conveyor 84.

Because of the relatively high temperatures of the containers as they are handled on the burn-off machine, as well as the temperatures generated by preheat burner 70 and main burner 74, a certain period of operation is required before steady state temperature conditions are achieved in all parts of the machine. During this initial start-up period, thermal expansion of both chain 40 and the machine frame will be encountered, thus requiring changes in the chain tensioning adjustment until steady state temperature conditions are achieved. Normally, this will require some manipulation of jack 60, which shifts main drive sprocket 46 and left-hand end turn 56 to increase or decrease the chain tension.

After steady state operation of the machine has been achieved, some further final adjustments of the burner elements 304 of main burner 74 may be required.

With all initial adjustments made and steady state operations achieved, chucks 42 approach loading point L with their gripping fingers 192 latched in their open position. At this time, the chuck actuating levers 222 are in their lowermost position and releasably latched in this position by the engagement of their shaft 230 within latching notch 258 on latch lever 252. As each chuck approaches loading point L, it is moved into underlying registry with a container suspended in an upright position on transfer machine 66. As the aligned container and open chuck 42 move along in vertical registry, the container is lowered by transfer machine 66 until the container bottom engages container seat 186. The transfer machine support fingers continue to lower, as described in detail in the aforementioned Banyas U.S. Pat. No. 3,590,982, thereby transferring support of the container to the chuck, and at this time latch roller 260 on the chuck latch assembly 250 is engaged by a stationary cam 68 on the machine frame which acts to release the latch, thereby permitting gripping fingers 192 on the chuck to close on the container under the action of chuck spring 220 which is cushioned by a second cam section which engages roller 240 to prevent the fingers from snapping shut. The fingers close uniformly to grippingly support the container on the chuck seat with the vertical axis of symmetry of the container coaxially aligned with the axis of chuck shaft 150.

The chuck then advances the container along the upper run, through pre-heat burners 70, the stationary chain of spin cycle mechanism 72 engaging the chuck sprockets 170 to rotate the chuck and supported containers.

The chucks then pass around end turn 56, inverting themselves and the container as they pass onto the lower run of the machine and into the entrance of main burner 74.

As the chucks enter main burner 74, their sprockets 170 are engaged by the endless chain 440 of spin cycle mechanism 76. The rate of rotation of the chucks by spin cycle mechanism 76 is determined by the algebraic difference between the speed of movement of the chucks and the speed aand direction in which chain 440 of spin cycle mechanism 76 is driven.

The rate of rotation of the container during its passage through burners 74 is of concern primarily in the finish forming step performed by burners 74, where a certain amount of centrifugal force is necessary to achieve the desired bead formation on the outside of the finish. Some compromise is necessary here, because a high rate of rotation during the moil severing operation is not desirable due to the fact that the moil may not be truly symmetrical. As explained in more detail in the aforementioned Heaton et al U.S. Pat. No. 3,703,363, the container and moil are initially formed integrally with a glass ribbon and are separated from the ribbon by a cracking off operation which results in a jagged fracture type edge on the moil which may be unsymmetrical to a point creating an unbalanced condition. For optimum severing, it is desired that the moil separate from the container body portion simultaneously around the entire circumference. When the moil is unbalanced, a high rate of rotation of the chuck will tend to cause the unbalanced moil to hinge, thus resulting in a distorted finish.

After the finish has been formed, the container leave main burner 74 and pass through a finish inspection station 78 which inspects the freshly formed finish for flaws. In the event a container with a flawed finish is detected at station 78, the station actuates a reject mechanism which inserts a cam into the path of movement of the actuating roller 248 of the chuck carrying the flawed container. The cam causes depression of the actuating lever 222 carrying roller 248 to depress the lever to open the gripping fingers 192 of the chuck. The lever 222 is latched in its depressed or chuck open position by latch assembly 250 to permit the container to drop freely from the inverted chuck. Gripping fingers of a chuck 42 actuated at inspection station 78 remain latched in their open position until they again reach the loading point L.

Chucks carrying containers having statisfactory finishes are not opened at inspection station 78, but proceed to the right along the lower run of the conveyor as viewed in FIG. 1 and pass on to the downwardly inclined track section 80, with the containers maintained in vertical alignment with a pocket 82 on the synchronized pocket conveyor 84. During their passage down inclined track section 80, the chuck and container axes are maintained in a vertical position by track 164 which guides rollers 162 on the chuck housing. The relationship of track 164 to inclined track section 80 is such that the chuck housing 140 is pivoted slightly about the axis of the link pin upon which it is supported to maintain the axes in a true vertical position. The containers, as they pass down inclined section 80 are lowered partially into the pockets of conveyor 84. At the lower end of inclined section 80, a stationary cam 86 on the machine frame engages the chuck actuating rollers to open the chucks which are immediately latched in the open position by latches 250. The container drops freely the remaining distance into the aligned pocket 82 of the pocket conveyor. The chucks remain latched in their open position until they again reach loading point L.

While we have described one embodiment of our invention it will be apparent to those skilled in the art that the disclosed embodiment may be modified. Therefore, the foregoing description is to be considered exemplary rather than limiting and the true scope of the invention is that defined in the following claims.

We claim:

1. A container chuck comprising a housing, an elongate shaft mounted in said housing for free rotation about its axis, an annular container seat assembly mounted on one end of said shaft for coaxial rotation therewith, a plurality of container gripping fingers mounted on said shaft for rotation therewith at symmetrically disposed locations about the shaft axis, means supporting said fingers on said shaft for concurrent movement between an open container release position and a closed container gripping position wherein said fingers are cooperable with said seat to grip and support a container upon said shaft in coaxial relationship therewith, lever means pivotally mounted on said housing and operable in a first position to locate said fingers in said open position and operable in a second position to locate said fingers in said gripping position, spring means biasing said lever means to said second position, and latch means on said housing for releasably latching said lever means in said first position.

2. A chuck as defined in claim 1 wherein said means mounting said fingers upon said shaft comprises a fulcrum plate detachably clamped to said one end of said shaft by said container seat assembly, said fulcrum plate having a plurality of pivot means thereon supporting said fingers for pivotal movement between their open and closed positions, said fingers shifting means in said lever means comprising a sleeve rotatably fixed to said shaft and supported upon said shaft for axial sliding movement upon pivotal movement of said lever means relative to said housing and means on said sleeve for pivoting said fingers concurrently upon said fulcrum plate upon axial movement of said sleeve on said shaft.

3. A chuck as defined in claim 2 wherein said seat assembly includes an annular seat member, a tubular spacer extending axially of said shaft and engaged between said seat and said fulcrum plate, and threaded securing means engaged between said seat and said shaft for axially clamping said seat, spacer and fulcrum plate to said one end of said shaft.

4. A chuck as defined in claim 1 wherein said lever means comprises a pair of interconnected spaced parallel arms pivotally mounted on said housing, coaxially aligned roller means mounted on the inner sides of said pair of arms, a sleeve mounted on said shaft for axial sliding movement and having a circumferentially extending annular groove receiving said roller means at diametrically opposed locations whereby pivotal movement of said arms on said housing is operable to shift said sleeve axially on said shaft, and means coupling said sleeve to said fingers to move said fingers between said open and said gripping position in response to axial movement of said sleeve on said shaft.

5. A chuck as defined in claim 4 wherein said spring means is engaged between said housing and said sleeve to bias said sleeve axially of said shaft.

6. A chuck as defined in claim 4 further comprising a third arm on said lever means rigidly interconnected to and disposed in spaced parallel relationship to said pair of arms, a shaft mounted in and extending between said third arm and the adjacent one of said pair of arms, said latch means having an arm pivotally mounted at one end on said housing and engaged at one side with said shaft, means pivotally biasing said arm against said shaft, and means defining a shaft receiving notch in said one side of said shaft for latchingly receiving said shaft when said lever means is in said first position.

* * * * *